US010145284B2

(12) United States Patent
Hoyos Velasco et al.

(10) Patent No.: US 10,145,284 B2
(45) Date of Patent: Dec. 4, 2018

(54) EXHAUST AFTER-TREATMENT SYSTEM INCLUDING SLIDING MODE AMMONIA CONTROLLER

(71) Applicant: GM Global Technology Operations LLC, Detroit, MI (US)

(72) Inventors: Carlos Ildefonso Hoyos Velasco, Turin (IT); Vincenzo Alfieri, Turin (IT); Maria Camuglia, Francavilla di Sicilia (IT); Giuseppe Conte, Turin (IT); Giuseppe Mazzara Bologna, Turin (IT); Carmen Pedicini, Turin (IT); David Tulli, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 37 days.

(21) Appl. No.: 15/496,723

(22) Filed: Apr. 25, 2017

(65) Prior Publication Data
US 2018/0306082 A1 Oct. 25, 2018

(51) Int. Cl.
F01N 3/00 (2006.01)
F01N 3/20 (2006.01)
F01N 11/00 (2006.01)

(52) U.S. Cl.
CPC .......... F01N 3/2073 (2013.01); F01N 3/208 (2013.01); F01N 11/007 (2013.01);
(Continued)

(58) Field of Classification Search
USPC ................. 60/274, 286, 295, 297, 301, 303
See application file for complete search history.

(56) References Cited

U.S. PATENT DOCUMENTS

| 2012/0255286 A1* | 10/2012 | Matsunaga | ......... | F02D 41/0055 |
| | | | | 60/287 |
| 2013/0232958 A1* | 9/2013 | Ancimer | ................. | F01N 3/208 |
| | | | | 60/301 |

(Continued)

*Primary Examiner* — Binh Q Tran
(74) *Attorney, Agent, or Firm* — Cantor Colburn LLP

(57) ABSTRACT

An automotive vehicle includes an internal combustion engine and an exhaust system. The exhaust treatment system includes a dosing system that injects $NH_3$ into an exhaust gas stream generated by the engine. An SCR device stores an amount of the $NH_3$ and converts NOx into diatomic nitrogen ($N_2$) and water ($H_2O$) based on the stored amount of the $NH_3$. The vehicle further includes an SCR status estimator device and a controller. The SCR status estimator device determines an $NH_3$ coverage ratio (R), which indicates a stored amount of $NH_3$ with respect to a maximum $NH_3$ storage capacity of the SCR device. The controller determines a target NOx reduction efficiency ($\eta_{NOx}$) of the SCR device, and an $NH_3$ coverage ratio set point ($R_{sp}$) based on the $\eta_{NOx}$. The controller also generates an $NH_3$ control signal (u) that controls the dosing system based on a comparison between the R and the $R_{sp}$.

20 Claims, 3 Drawing Sheets

(52) U.S. Cl.
CPC .... *F01N 2550/05* (2013.01); *F01N 2560/026* (2013.01); *F01N 2610/02* (2013.01); *F01N 2900/0404* (2013.01); *F01N 2900/1616* (2013.01)

(56) References Cited

U.S. PATENT DOCUMENTS

| | | | |
|---|---|---|---|
| 2014/0033683 A1* | 2/2014 | Wei | F01N 3/208 60/274 |
| 2016/0326928 A1* | 11/2016 | Osburn | F01N 3/18 |
| 2017/0044953 A1* | 2/2017 | Shinoda | F01N 3/2073 |

* cited by examiner

EXHAUST AFTER-TREATMENT SYSTEM INCLUDING SLIDING MODE AMMONIA CONTROLLER

INTRODUCTION

The subject disclosure relates to automotive vehicle exhaust systems, and more particularly, to automotive vehicle exhaust treatment systems.

Automotive internal combustion engines emit exhaust gas that includes carbon monoxide (CO), hydrocarbons (HC), and oxides of nitrogen (NOx). Therefore, automotive vehicles typically include exhaust treatment systems for removing particulate matter and reducing regulated constituents from exhaust gas produced by the engine before expelling the exhaust gas from the vehicle. Exhaust treatment systems typically include a selective catalytic reduction (SCR) device that converts NOx into diatomic nitrogen ($N_2$) and water ($H_2O$) in the presence of a reductant catalyst such as ammonia ($NH_3$), for example, thereby reducing the level of NOx emissions expelled from the vehicle.

SUMMARY

In a non-limiting embodiment, an automotive vehicle includes an internal combustion engine and a dosing system. The internal combustion engine is configured to combust an air/fuel mixture to generate an exhaust gas stream containing oxides of nitrogen (NOx). The dosing system injects $NH_3$ into the exhaust gas stream to generate a mixture of $NH_3$ and exhaust gas. A selective catalyst reduction (SCR) device is configured to store an amount of the $NH_3$, and to convert the NOx into diatomic nitrogen ($N_2$) and water ($H_2O$) based on the stored amount of the $NH_3$. The vehicle further includes an SCR status estimator device in signal communication with an electronic hardware controller. The SCR status estimator device is configured to determine an $NH_3$ coverage ratio (R), which is indicative of a stored amount of $NH_3$ with respect to a maximum $NH_3$ storage capacity of the SCR device. The controller is configured to determine a target NOx reduction efficiency ($\eta_{NOx}$) of the SCR device, and to determine an $NH_3$ coverage ratio set point ($R_{sp}$) based on the $\eta_{NOx}$. The controller also generates an $NH_3$ control signal (u) that controls the dosing system based on a comparison between the R and the $R_{sp}$. The dosing system injects an amount of the $NH_3$ in response to the $NH_3$ control signal (u).

In addition to one or more of the features described herein, or as an alternative, further embodiments include a feature, wherein the controller is configured to determine a deviation between the R and the $R_{sp}$, and to adjust the amount of $NH_3$ injected into the exhaust gas stream in response to the deviation.

In addition to one or more of the features described herein, or as an alternative, further embodiments include a NOx sensor configured to output a NOx signal indicating a mass concentration of the NOx.

In addition to one or more of the features described herein, or as an alternative, further embodiments include a feature, wherein the SCR status estimator device is an Extended Kalman Filter (EKF) including an input that receives the SCR outlet NOx sensor signal and an output in signal communication with the controller. The EKF estimates a concentration of slipped $NH_3$ ($\hat{C}_{NH3}$) released by the SCR device, and a concentration of NOx exiting the SCR device.

In addition to one or more of the features described herein, or as an alternative, further embodiments include a feature, wherein the EKF is configured to estimate the R and the $\hat{C}_{NH3}$ based on a physical linear dynamical model of the SCR device.

In addition to one or more of the features described herein, or as an alternative, further embodiments include a feature, wherein the controller wherein the controller determines a temperature of the SCR device, updates $\eta_{NOx\_sp}$ in response to the temperature exceeding a temperature threshold, and computes an updated $R_{sp}$ based on the updated $\eta_{NOx\_sp}$.

In addition to one or more of the features described herein, or as an alternative, further embodiments include a feature, wherein the controller determines the amount of $NH_3$ to be injected into the exhaust gas stream based further on the $\hat{C}_{NH3}$.

In addition to one or more of the features described herein, or as an alternative, further embodiments include a feature, wherein the controller adjusts the amount of $NH_3$ injected into the exhaust gas stream to reduce the $\hat{C}_{NH3}$.

In addition to one or more of the features described herein, or as an alternative, further embodiments include a feature, wherein the controller adjusts the amount of $NH_3$ injected into the exhaust gas stream in response to the deviation such that the $\eta_{NOx}$ is maintained within a $\eta_{NOx}$ threshold range.

In another non-limiting embodiment, a sliding mode selective catalyst reduction (SCR) control system included with an exhaust treatment system of an automotive vehicle comprises an $NH_3$ coverage ratio controller configured to determine an $NH_3$ coverage ratio set point ($R_{sp}$) that operates an SCR device at a selected NOx reduction efficiency set point ($\eta_{NOx\_SP}$). The sliding mode SCR control system further includes an SCR status estimator device and a $NH_3$ sliding-mode-control (SMC) module. The SCR status estimator device is configured to estimate an $NH_3$ coverage ratio (R) of the SCR device, a concentration of slipped $NH_3$ ($\hat{C}_{NH3}$) released by the SCR device, and a concentration of NOx exiting the SCR device. The R is indicative of an amount of $NH_3$ stored by the SCR device with respect to a maximum $NH_3$ storage capacity of the SCR device. The $NH_3$ SMC module is configured to monitor the R and to determine a deviation between R with respect to the $R_{sp}$. The sliding mode SCR control system further includes a $NH_3$ calculator module configured to generate an $NH_3$ control signal (u) indicating the amount of $NH_3$ to be injected based on the deviation. A dosing system is configured to inject the corrected amount of $NH_3$ based on the $NH_3$ control signal (u).

In addition to one or more of the features described herein, or as an alternative, further embodiments include a feature, wherein the amount of $NH_3$ injected according to the u reduces the deviation between R and $R_{sp}$ such that the $\eta_{NOx\_SP}$ is maintained.

In addition to one or more of the features described herein, or as an alternative, further embodiments include an $NH_3$ slip detection controller in signal communication with the SCR status estimator device. The $NH_3$ slip detection controller is configured to determine an $NH_3$ slip event in response to the $\hat{C}_{NH3}$ exceeding an $NH_3$ slip threshold value ($C_{NH3\_TH}$).

In addition to one or more of the features described herein, or as an alternative, further embodiments include a feature, wherein the $NH_3$ slip detection controller generates a $NH_3$ slip correction value ($u_{NH3SLIP}$) that modifies the u in response to determining the $NH_3$ slip event.

In yet another non-limiting embodiment, a method controls a NOx reduction efficiency of a vehicle exhaust treatment system. The method comprises combusting an air/fuel mixture to generate exhaust gas stream containing oxides of nitrogen (NOx), and injecting $NH_3$ into the exhaust gas stream, via a dosing system, to generate a mixture of $NH_3$ and exhaust gas. The method further comprises storing the injected $NH_3$, via a selective catalyst reduction (SCR) device included in the exhaust treatment system, and converting the NOx into diatomic nitrogen ($N_2$) and water ($H_2O$) based on the stored amount of the $NH_3$. The method further includes determining a NOx reduction efficiency set point ($\eta_{NOx\_SP}$) indicative of a selected NOx reduction efficiency of the SCR device, and determining an $NH_3$ coverage ratio set point ($R_{sp}$) indicative of a stored amount of $NH_3$ with respect to a maximum $NH_3$ storage capacity of the SCR device for reaching the $\eta_{NOx\_SP}$. The method further includes estimating an $NH_3$ coverage ratio (R) indicative of an actual amount of the stored $NH_3$ with respect to the maximum $NH_3$ storage capacity of the SCR device, and generating an $NH_3$ control signal (u) based on a comparison between the R and the $R_{sp}$, the u controlling the amount of $NH_3$ injected by the dosing system.

In addition to one or more of the features described herein, or as an alternative, further embodiments include determining a deviation between the R and the $R_{sp}$, and adjusting the amount of $NH_3$ injected into the exhaust gas stream in response to the deviation.

In addition to one or more of the features described herein, or as an alternative, further embodiments include estimating R based on each of a mass concentration of the NOx exiting the SCR device, and an estimated concentration of slipped $NH_3$ ($\hat{C}_{NH3}$) released by the SCR device.

In addition to one or more of the features described herein, or as an alternative, further embodiments include estimating the R and the $\hat{C}_{NH3}$, via an Extended Kalman Filter (EKF), based on a physical linear dynamical model of the SCR device.

In addition to one or more of the features described herein, or as an alternative, further embodiments include monitoring a temperature of the SCR device, updating $\eta_{NOx\_sp}$ in response to the temperature exceeding a temperature threshold, and computing an updated $R_{sp}$ based on the updated $\eta_{NOx\_sp}$.

In addition to one or more of the features described herein, or as an alternative, further embodiments include determining the amount of $NH_3$ to be injected into the exhaust gas stream based further on the $\hat{C}_{NH3}$.

In addition to one or more of the features described herein, or as an alternative, further embodiments include adjusting the amount of $NH_3$ injected into the exhaust gas stream to reduce the $\hat{C}_{NH3}$.

In addition to one or more of the features described herein, or as an alternative, further embodiments include adjusting the amount of $NH_3$ injected into the exhaust gas stream in response to the deviation such that the $\eta_{NOx}$ is maintained within a $\eta_{NOx}$ threshold range.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
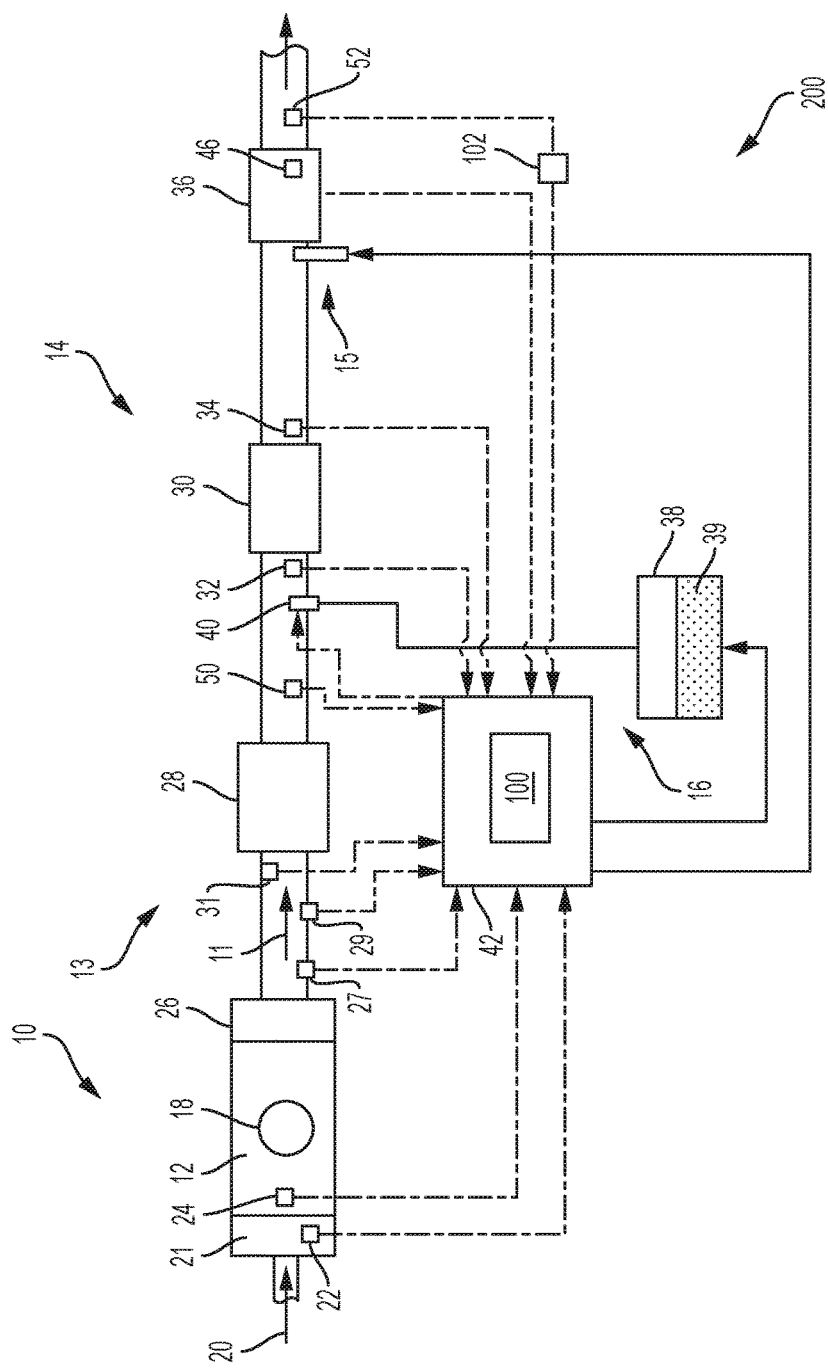
FIG. 1 is a functional block diagram of an engine control system including a hardware controller that controls an exhaust treatment system according to a non-limiting embodiment

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

SCR devices store a limited amount of $NH_3$ due to the limited volume of the SCR catalyst. The ratio of stored $NH_3$ with respect to the maximum storage capacity of the SCR catalyst is referred to herein as the actual $NH_3$ coverage ratio (i.e., "R"). The value of R has a mutual correlation with respect to the efficiency of the SCR device to reduce the amount of NOx from the exhaust gas stream.

The efficiency of the SCR device is referred to herein as NOx reduction efficiency ($\eta_{NOx}$). For instance, $\eta_{NOx}$ is improved as the calculated value representing R is brought closer to "1". The $\eta_{NOx}$ value can be computed as a percentage defined in the range [0%-100%]. As the SCR device operates at a higher efficiency, i.e. $\eta_{NOx}$ brought closer to 100%, the amount of NOx removed from the exhaust gas stream is increased. Based on the correlation between R and $\eta_{NOx}$, the $\eta_{NOx}$ of the SCR device can be increased as R is brought closer to "1".

Variations in NOx levels generated by the engine due to vehicle speed transient conditions, altitude variations, and/or combustion modes, for example, can create $NH_3$ slip conditions which impact the ability of the SCR catalyst to store $NH_3$. In addition, temperature increases of the SCR catalyst can lower its capability to store $NH_3$. Therefore, as the SCR catalyst temperature increases, $NH_3$ delivery into the exhaust gas stream is typically adjusted to ensure acceptable SCR performance is maintained while also aiming to prevent $NH_3$ slip.

Exhaust treatment systems utilize $NH_3$ injection set points to control the delivery of $NH_3$ into the exhaust gas stream. The $NH_3$ injection set points are stored in the memory of a hardware controller installed on the vehicle, and adjusted according to a temperature of the SCR catalyst to determine the amount of $NH_3$ to inject at a given vehicle operating condition. However, non-linear engine operating conditions such as high-speed transient conditions (e.g., vehicle accelerations), for example, can cause sudden increments in both the SCR catalyst temperature and NOx concentration, which in turn can increase the NOx emissions and $NH_3$ slip if the amount of $NH_3$ injected into the exhaust gas stream is not adjusted properly. Consequently, determining the $NH_3$ injection set points based solely on SCR catalyst temperatures can cause an imprecise amount of $NH_3$ to be injected into the exhaust gas stream, resulting in an inefficient $NH_3$ consumption and poor NOx reduction efficiency.

In one or more embodiments described herein, the controller computes a novel set point referred to as an $NH_3$ coverage ratio set point ($R_{sp}$). The $R_{sp}$ value is computed as a function of $\eta_{NOx}$. For example, $R_{sp}$ can be calculated as a selected R for achieving a target $\eta_{NOx}$, or maintaining $\eta_{NOx}$ within a target $\eta_{NOx}$ threshold range. Thus, a target $\eta_{NOx}$ at a given vehicle operating condition can be selected using a $\eta_{NOx}$ set point ($\eta_{NOx\_sp}$), and the controller can compute the $R_{sp}$ necessary to achieve the $\eta_{NOx\_sp}$. A dosing system is then controlled to inject the correct amount of $NH_3$ into the exhaust gas stream to maintain R at $R_{sp}$, or near, $R_{sp}$, thereby improving the overall operating efficiency of the SCR device. In another embodiment, the controller can actively compute $R_{sp}$ as vehicle operating conditions change. Therefore, the SCR device can be operated at a selected $\eta_{NOx}$ while taking into account the changing vehicle conditions.

Referring now to FIG. 1, an engine system 10 is schematically illustrated. The engine system 10 includes an internal combustion engine 12 and an exhaust system 13. The exhaust system 13 described herein can be implemented with various types of engine systems including, but not limited to, diesel engine systems, gasoline engine systems, and hybrid engines systems that implement an internal combustion engine in conjunction with an electric motor.

The engine 12 includes one or more cylinders 18, an intake manifold 21, a mass air flow (MAF) sensor 22, and an engine speed sensor 24. Air 20 flows into the engine 12 via the intake manifold 21 and is monitored by the MAF sensor 22. The air 20 is directed into the cylinder 18 and is combusted with fuel to drive pistons (not shown). Although a single cylinder 18 is illustrated, it can be appreciated that the engine 12 may include additional cylinders 18. For example, the engine system 10 can implement an engine 12 having 2, 3, 4, 5, 6, 8, 10, 12 and 16 cylinders. Exhaust gas is produced inside the cylinder 18 resulting from a combustion of air and fuel.

The exhaust system 13 further includes an exhaust treatment system 14 and a dosing system 16. The exhaust treatment system 14 treats an exhaust gas stream 11 delivered, via an exhaust manifold 26, before it is released to the atmosphere. The exhaust treatment system 14 may include an oxidation catalyst (OC) device 28, a selective catalyst reduction (SCR) device 30, and a particulate filter (PF) device 36 such as, for example, a diesel PF (DPF). As can be appreciated, the exhaust treatment system 14 of the present disclosure may include other combinations of exhaust treatment devices (not shown).

The OC device 28 can be one of various flow-through, oxidation catalyst devices known in the art. The OC device 28 may include an OC substrate having an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC device 28 is useful in treating unburned gaseous and non-volatile HC and CO, which are oxidized to form carbon dioxide ($Co_2$) and water ($H_2O$).

The SCR device 30 may be disposed downstream of the OC device 28, and is configured to reduce NOx constituents that are present in the exhaust gas stream 11. In various embodiments, the SCR device 30 can be constructed using a flow-through monolith SCR substrate (not shown), including an SCR catalyst composition (e.g., an SCR washcoat) applied thereon. The SCR device 30 utilizes a reductant such as $NH_3$, for example, to assist in reducing a level of NOx from the exhaust gas stream 11. More specifically, the SCR catalyst composition can contain a zeolite and one or more base metal components such as iron (Fe), cobalt (Co), copper (Cu) or vanadium (V) which operates to decompose NOx constituents in the presence of $NH_3$. The $NH_3$ utilized by the SCR device 30 may be in the form of a gas, a liquid, or an aqueous solution and can be delivered into the exhaust gas stream 11 by the dosing system 16, as discussed herein.

The PF device 36 is disposed downstream from the SCR device 30, and filters the exhaust gas stream 11 of carbon and other particulate matter (e.g. soot). According to at least one exemplary embodiment, the PF device 36 may be constructed using a ceramic wall flow monolith substrate (not shown) that traps particulate matter as the exhaust gas stream 11 travels therethrough. It is appreciated that the ceramic wall flow monolith substrate is merely exemplary in nature and that the PF device 36 may include other filter devices such as wound or packed fiber filters, open cell foams, sintered metal fibers, etc. To enhance the performance of the PF device 36, a catalytic material can be applied to the PF substrate. The PF catalyst promotes oxidation of hydrocarbons, carbon monoxide (CO), soot, and particulate matter trapped in the PF substrate under conditions that cause exothermic reactions in the PF substrate.

The exhaust treatment system 13 can also include a PF regeneration system 15. The PF regeneration system 15 performs a regeneration process that cleans the PF device 36 by burning off the particulate matter trapped in the PF substrate. Such a system is known and, therefore, will not be discussed further.

Additional sensors may also be employed to monitor various operating conditions. For example, a pressure sensor 27 determines an exhaust pressure at a given vehicle operating condition. An exhaust gas flow rate sensor 29 can be positioned between the engine 12 and the OC device 28, and measures the flow rate of the exhaust gas stream 11. An exhaust temperature sensor 31 can be positioned between the engine 12 and the OC device 28 to measure the temperature of the exhaust gas stream 11. An inlet temperature sensor 32 can be located upstream from the SCR device 30 to monitor the temperature at the inlet of the SCR device 30. An outlet temperature sensor 34 can be located downstream from the SCR device 30 to monitor the temperature at the outlet of the SCR device 30.

The dosing system 16 includes an $NH_3$ tank 38 and a dosing injector 40. The $NH_3$ tank 38 stores a supply of $NH_3$ 39. The dosing injector 40 injects the $NH_3$ 39 from the $NH_3$ tank 38 into the exhaust gas stream 11. The $NH_3$ mixes with the exhaust gas and serves as a catalyst in concert with the SCR washcoat deposited on the SCR catalyst to decompose the NOx contained in the exhaust gas stream 11. For instance, the mixture of exhaust gas and $NH_3$ chemically reacts with the SCR catalyst to convert NOx into diatomic nitrogen ($N_2$) and water ($H_2O$), thereby reducing the level of NOx emissions.

A PF temperature sensor 46 generates a particulate filter temperature signal that indicates a measured temperature of the PF substrate. Other sensors in the exhaust system 13 may include, for example, an upstream NOx sensor 50 and a downstream NOx sensor 52. The upstream NOx sensor 50 can indicate a level of NOx entering the SCR device 30, while the downstream NOx sensor 52 can be positioned downstream from the PF device 36 to measure a concentration of NOx (e.g., a mass concentration of NOx measured in mass per volume) exiting the PF device 36.

An electronic hardware controller 42 can regulate and control various operations including, but not limited to, the mass flow rate of air delivered to the intake manifold 21 and fuel injection timings of the engine 12. The controller 42 also includes a reductant module 100 that stores various algorithms, models, lookup tables (LUTs), and/or set point values that assist in controlling $NH_3$ injection time and/or $NH_3$ dosing amounts. The controller 42, including the reductant module 100, can be constructed as an electronic hardware controller that includes memory and a processor configured to execute algorithms and computer-readable program instructions stored in the memory.

In at least one embodiment, a sliding mode SCR control system 200 is implemented and is configured to optimize the operating performance of the SCR device 30. The sliding mode control system 200 utilizes various estimates of the actual operating status of the SCR device 30 to reduce, or even prevent, $NH_3$ slippage. The various estimates include, but are not limited to, an estimated amount of $NH_3$ ($r_{RED\_ST}$) actually stored on the SCR catalyst, an estimated $NH_3$ coverage ratio ($\hat{R}$) of the SCR catalyst, and an estimated concentration of $NH_3$ slip ($\hat{C}_{NH3}$) that is present downstream from the PF device 36.

Sensors are not readily available to measure the previously mentioned SCR operating status values. Therefore, the sliding mode SCR control system 200 employs an SCR operating status observer, referred to herein as an SCR status estimator device 102. The SCR status estimator device 102 is in signal communication with the downstream NOx sensor 52 and the controller 42. In at least one embodiment, the SCR status estimator device 102 is constructed as an extended Kalman filter (EKF), for example. Although an EKF is described herein, any type of estimation device may be implemented.

The EKF is an extension of a Kalman filter typically applied to model the behavior of nonlinear systems. For instance, the EKF utilizes a linearized model of an SCR dynamical model to estimate the non-linear behavior of the SCR device 30. The SCR status estimator device 102 may also utilize additional measurement signals to estimate the operating status of the SCR device 30 including, but not limited to, an SCR inlet temperature measured by the inlet temperature sensor 32, an SCR outlet temperature measured by the outlet temperature sensor 34, the mass flowrate of air measured by the MAF sensor 22, the exhaust pressure measured by the pressure sensor 27, the temperature of the exhaust gas measured by the exhaust temperature sensor 31, and the exhaust gas flow rate measured by the exhaust gas flow rate sensor 29.

The reductant module 100 determines a novel $NH_3$ coverage ratio set point ($R_{sp}$) associated with the SCR device 30. In at least one embodiment, $R_{sp}$ is determined by the reductant module 100 using a set point transformation function given by the formula:

$$R_{sp} = \frac{F}{\Theta \cdot r_{RED\_ST}} \left( \frac{\eta_{NOx\_sp}}{100 - \eta_{NOx\_sp}} \right), \quad \text{[Eq. 1]}$$

where:
F is the exhaust gas mass flow;
$\eta_{NOx\_sp}$ is a selected target NOx reduction efficiency set point;
$\Theta$ is the maximum $NH_3$ storage capacity of the SCR catalyst;

$r_{RED\_ST}$ is an estimated amount of $NH_3$ stored on SCR catalyst.

As described herein, "R" is defined as a ratio of stored $NH_3$ with respect to the maximum storage capacity of the SCR catalyst. In other words, "R" indicates the actual $NH_3$ load of the SCR catalyst at a given point in time, with respect to the maximum $NH_3$ storage capacity ($\Theta$) of the SCR catalyst. In at least one embodiment, "R" can be defined as:

$$R = \frac{\text{stored } NH_3}{\Theta} \quad \text{[Eq. 2]}$$

Commercial sensors capable of directly measuring R are not readily available. Therefore, the SCR status estimator device 102 can utilize the output of the downstream NOx sensor 52, which indicates a measured concentration of NOx, to output one or more SCR status signals indicating $\hat{R}$, and an estimated concentration of $NH_3$ ($\hat{C}_{NH3}$) present downstream from the SCR device 20. The $\hat{C}_{NH3}$ can be as a mass concentration of $NH_3$ measured in mass per volume. If the NOx sensor 52 is omitted from the exhaust treatment system 14, the SCR status estimator device 102 can also estimate a concentration of NOx ($\hat{C}_{NOx}$) that is present downstream from the SCR device 30. The reductant module 100 utilizes the estimated SCR status signals to determine $\hat{R}$, and then outputs a control signal that controls the amount of $NH_3$ 39 to inject into the exhaust gas stream 11 via the injector 40.

In a non-limiting embodiment, the reductant module 100 controls the dosing system 16 based on $\hat{R}$ (i.e., the estimate value indicating R) at a given vehicle operating condition. As described herein, R has a mutual correlation with respect to $\eta_{NOx}$. Therefore, $R_{sp}$ can be selected to achieve a targeted $\eta_{NOx}$ as set by $\eta_{NOx\_SP}$. maximizing R can improve $\eta_{NOx}$. The reductant module 100 actively computes a control signal ($u_{SMC}$) that influences the dosing system 16 to inject the correct amount of $NH_3$ into the exhaust gas stream to reach or maintain $R_{sp}$. In this manner, the SCR device 30 can be controlled to operate at a targeted $\eta_{NOx}$, which is set by $\eta_{NOx\_SP}$, and the amount of $NH_3$ can be actively adjusted so that R is maintained at, or near, $R_{sp}$ to ensure the SCR device 30 operates at the selected $\eta_{NOx\_SP}$. In this manner, the sliding mode SCR control system 200 performs a closed-loop control or feedback control that optimizes the operation of the SCR device 30 and improves overall NOx conversion efficiency.

The reductant module 100 also can determine an appropriate amount of $NH_3$ 39 to inject into the exhaust gas stream 11 when a $NH_3$ slip event occurs, without oversaturating the SCR device 30 during $NH_3$ slip conditions. Accordingly, $NH_3$ slip from the SCR device 30 may be reduced, or prevent during a given operating condition of the engine system 10. In at least one non-limiting embodiment, the reductant module 100 utilizes $\hat{C}_{NH3}$ output by SCR status estimator device 102 to determine or detect a $NH_3$ slip event. When a $NH_3$ slip event is detected, a suitable correction value ($u_{NH3SLIP}$) is computed and applied to $u_{SMC}$. Accordingly, $u_{SMC}$ is modified and a control signal (u) is generated that takes into account the slipped $NH_3$ event detected by the reductant module 100. The control signal u is also delivered to the SCR status estimator device 102. Accordingly, the SCR status estimator device 102 can continue determining $\hat{R}$, taking into account the slipped $NH_3$ event detected by the reductant module 100.

In another feature, the reductant module 100 may selectively disable the sliding mode SCR control system 200 based on the operating conditions of the engine system 10. For example, the reductant control module can determine when the engine system 10 operates during certain temperatures conditions or ranges that discourage $NH_3$ delivery to the exhaust gas stream due to adverse physical interactions between the $NH_3$ and the SCR catalyst. When these conditions are present, the reductant control module disables the sliding mode SCR control system 200 so that $NH_3$ is not injected into the exhaust gas stream 11.

Figure 2:
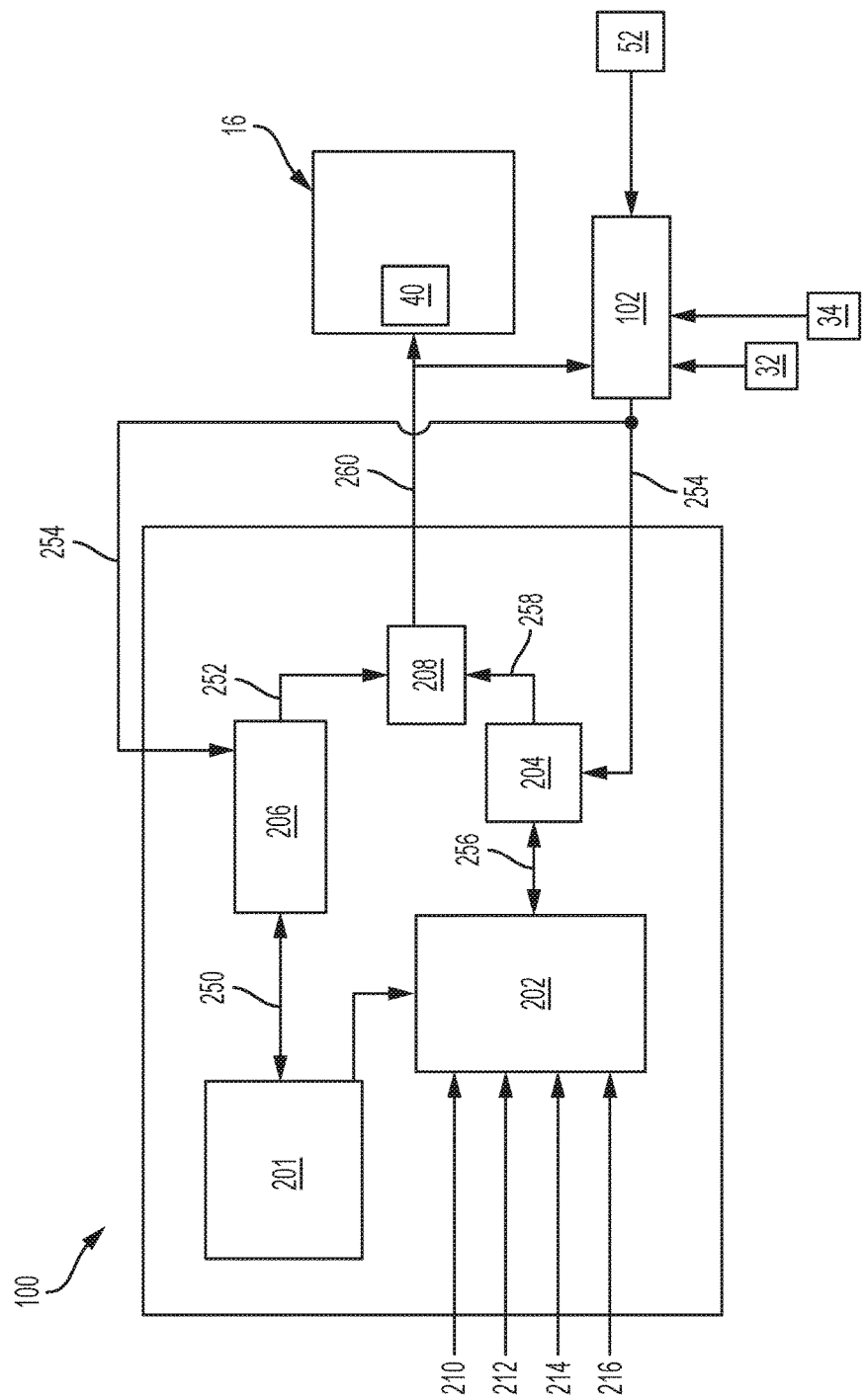
FIG. 2 is a block diagram of a reductant module configured to improve NOx reduction efficiency of an SCR device according to a non-limiting embodiment.

Turning now to FIG. 2, a reductant module 100 is illustrated according to a non-limiting embodiment. In at least one embodiment, the reductant module 100 computes an amount of $NH_3$ necessary to reach or maintain $R_{sp}$ for achieving the selected $\eta_{NOx\_SP}$. The reductant module 100 includes a memory storage unit 201, a $R_{sp}$ module 202, an $NH_3$ sliding-mode-control (SMC) module 204, an $NH_3$ slip detection module 206, and an $NH_3$ calculator module 208. The reductant module 100, along with any one of the $R_{sp}$ module 202, the $NH_3$ SMC module 204, the $NH_3$ slip detection module 206, and the $NH_3$ calculator module 208 can be constructed as an electronic hardware controller that includes memory and a processor configured to execute algorithms and computer-readable program instructions stored in the memory.

The memory storage unit 201 stores various algorithms, models, LUTs, and/or set point values utilized to control one or more components of the exhaust treatment system. For example, the memory storage unit 201 stores an $NH_3$ slip threshold value ($C_{NH3\_TH}$) 250, which can be compared against $\hat{C}_{NH3}$ to detect an $NH_3$ slip event.

The $R_{sp}$ module 202 is configured to determine $R_{sp}$. As described herein, $R_{sp}$ is selected to reach or maintain a $\eta_{NOx\_SP}$ corresponding to a target $\eta_{NOx}$ of the SCR device. In at least one embodiment, $R_{sp}$ is computed based on the physical model equation (see Eq. 1) which indicates the R for achieving a target $\eta_{NOx}$ with respect to one or more given vehicle operating conditions. The vehicle operating conditions include, but are not limited, engine speed 210, engine load 212, exhaust temperature 214, and SCR temperature 216.

The $NH_3$ SMC module 204 is in signal communication with the $R_{sp}$ module 202 and the SCR status estimator device 102, and is configured to determine whether R deviates from $R_{sp}$. For instance, the $NH_3$ SMC module 204 receives a $R_{sp}$ signal 256 from the $R_{sp}$ module 202 indicative of the selected $R_{sp}$ necessary to reach or maintain $\eta_{NOx\_SP}$. The $NH_3$ SMC module 204 also obtains $\hat{R}$, $\hat{C}_{NH3}$, and $\hat{C}_{NOx}$ from an SCR status signal 254 output by the SCR status estimator device 102. Accordingly, the $NH_3$ SMC module 204 computes the correct amount of $NH_3$ to be injected into the exhaust gas stream based on the difference between R (e.g., as indicated by $\hat{R}$) and $R_{sp}$, and generates $u_{SMC}$ 258 which indicates an amount of $NH_3$ needed reach $R_{sp}$ or maintain R near $R_{sp}$, i.e., within a threshold range of $R_{sp}$.

A difference between $\hat{R}$ and $R_{sp}$ indicates that R has deviated from the $R_{sp}$. In another embodiment, the $NH_3$ SMC module 204 may determine a deviation has occurred when the difference between $\hat{R}$ and $R_{sp}$ exceeds a threshold value ($R_{TH}$). The deviation ultimately affects the amount of injected $NH_3$ that is necessary to maintain the SCR device at the selected $\eta_{NOx\_SP}$. When there is a deviation or error between $\hat{R}$ and $R_{sp}$, the $NH_3$ SMC module 204 modifies the $u_{SMC}$ 258 so that the amount of $NH_3$ injected into the exhaust gas stream is adjusted, thereby adjusting R. In at least one embodiment, the $NH_3$ SMC module 204 continuously monitors $\hat{R}$, and actively modifies the $u_{SMC}$ 258 to adjust the amount of $NH_3$ injected by the dosing system 16. The active modification of $u_{SMC}$ 258 causes the dosing system 16 to continuously inject more or less $NH_3$ into the exhaust gas stream, which in turn adjusts R. Therefore, R can be returned to $R_{sp}$ if a deviation occurs.

In another embodiment, the $NH_3$ SMC module 204 determines a change in vehicle operating conditions based on $\hat{C}_{NH3}$, indicated by the SCR status signal 254, and a concentration of NOx. The concentration of NOx can be a measured value output from the downstream NOx sensor 52 or an estimated value ($\hat{C}_{NOx}$) indicated by the SCR status signal 254. In response to the changing operating conditions (e.g., when the SCR temperature exceeds a temperature threshold), an updated $\eta_{NOx\_SP}$ may be determined, and the $NH_3$ SMC module 204 can request a second $R_{sp}$ (e.g., an updated $R_{sp}$) from the $R_{sp}$ module 202. In this manner, R can be constantly monitored (i.e., as indicated by $\hat{R}$) and $R_{sp}$ can be actively adjusted to achieve a targeted $\eta_{NOx}$ at different vehicle operating conditions.

The $NH_3$ slip detection module 206 is configured to detect an $NH_3$ slip event, and to determine a correction value ($u_{NH3SLIP}$) 252 that modifies $u_{SMC}$ to compensate for the $NH_3$ slip event. In at least one embodiment, the $NH_3$ slip detection module 206 obtains $C_{NH3\_TH}$ 250 and determines a concentration of slipped $NH_3$ released from the SCR device. The slipped amount of $NH_3$ can be a measured concentration of slipped $NH_3$ ($C_{NH3}$) obtained from a $NH_3$ slip sensor (not shown) or can be an estimated concentration of slipped $NH_3$ ($\hat{C}_{NH3}$) obtained from the SCR status signal 254. In one or more embodiments, the value $\hat{C}_{NH3}$ is estimated based on the concentration of NOx output from the downstream NOx sensor 52, along with additional measured values including, but not limited to, the SCR inlet temperature measured by the inlet temperature sensor 32, and the SCR outlet temperature measured by the outlet temperature sensor 34.

A $NH_3$ slip event can be detected when $C_{NH3}$ or $\hat{C}_{NH3}$ exceeds $C_{NH3\_TH}$. In at least one embodiment, the $NH_3$ slip module 206 determines $u_{NH3SLIP}$ based on the following equation:

$$u_{NH3SLIP} = k_p \cdot e_{NH3} + k_i S_{NH3}, \quad [\text{Eq. 3}]$$

where $k_p$ is the proportional gain (e.g., a calibration value);

$e_{NH3}$ is the error between $C_{NH3\_TH}$ and $C_{NH3}$ or $\hat{C}_{NH3}$ at the SCR outlet;

$k_i$ is the integral gain (e.g. a calibration value); and $S_{NH3}$ is the cumulative error in the integral action computed at each iteration as $S_{NH3[k]} = S_{NH3[k-1]} + (T_s \cdot e_{NH3[k]})$, with $T_s$ being the sampling time over a given SCR operating period.

The $NH_3$ calculator module 208 combines $u_{SMC}$ 258 and $u_{NH3SLIP}$ 252, and scales the combined value to obtain u, which indicates the amount of $NH_3$ injected into the exhaust gas stream. In at least one embodiment, the $NH_3$ calculator module 208 generates an $NH_3$ control signal 260 indicative of u, which controls the amount of $NH_3$ to be injected by the dosing system 16 to maintain $R_{sp}$. In at least one embodiment, u, as indicated by the $NH_3$ control signal 260, is represented by the expression:

$$u = G(u_{SMC} + u_{NH3SLIP}), \text{ where } G \text{ is a scaling factor} \quad [\text{Eq. 4}]$$

The scaling factor (G) is utilized to transform u having measured units of grams per second (g/s) into an equivalent $NH_3$ control signal having measured units of milligrams per second (mg/s).

Accordingly, the reductant module 100 can compute $R_{sp}$ as a function of $\eta_{NOx}$. Thus, a target $\eta_{NOx}$ at a given vehicle operating condition can be set according to $\eta_{NOx\_sp}$. The reductant module 100 can actively monitor R, and (recognizing the mutual correlation between R and $\eta_{NOx}$) compute the necessary $R_{sp}$ to achieve the $\eta_{NOx\_sp}$ while taking into account changes in vehicle operating conditions.

Figure 3:
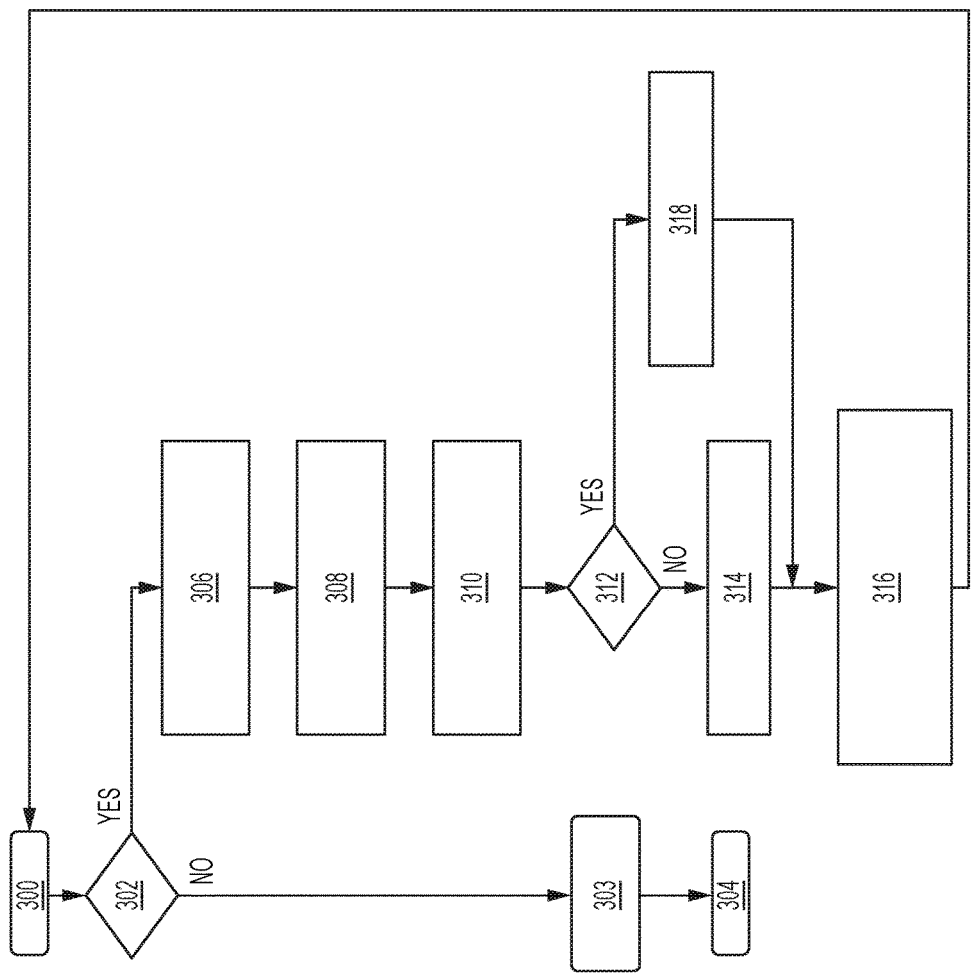
FIG. 3 is a flow diagram illustrating a method of improving NOx reduction efficiency of an SCR device according to a non-limiting embodiment.

Turning now to FIG. 3, a flow diagram illustrates a method for operating a sliding mode SCR control system 200 that controls the NOx reduction efficiency of an SCR device 30 according to a non-limiting embodiment. The method begins at operation 300, and at operation 302, a determination is made as to whether the sliding mode SCR control system 200 is enabled or disabled. For instance, the sliding mode SCR control system 200 can be disabled, e.g., when the engine system 10 operates above a temperature threshold that reduces the performance of the SCR device 30. When the sliding mode SCR control system 200 is disabled, the dosing system 16 inhibits $NH_3$ injection from the dosing system 16 at operation 303 to avoid delivering $NH_3$ into the exhaust gas stream 111 during undesirable operating conditions of the SCR device 30, and the method ends at operation 304.

When, however, the sliding mode SCR control system 200 is enabled at operation 302, the method proceeds to operation 306 such that a $\eta_{NOx\_SP}$ corresponding to a target a target $\eta_{NOx}$ is determined, and estimated measurements (e.g., $\hat{R}$, $\hat{C}_{NH3}$, $\hat{C}_{NOx}$, etc.) output from the SCR status estimator device 102. At operation 308, $R_{sp}$ for achieving $\eta_{NOx\_SP}$ is determined. In at least one embodiment, $R_{sp}$ is determined based on $\eta_{NOx\_SP}$. At operation 310, $u_{SMC}$ is computed and a control signal for controlling the dosing system 16 is generated based on $u_{SMC}$. The value $u_{SMC}$ can be computed based on $\hat{C}_{NH3}$, $\hat{C}_{NOx}$, $\hat{R}$, and $R_{sp}$, and which can be estimated using the SCR status estimator device 102. Additional measured values such as, for example, exhaust gas flow rate through the SCR device 30, SCR catalyst temperatures, etc., can also be utilized to assist in determining $u_{SMC}$. As vehicle operating conditions change, R is monitored based on $\hat{R}$. Accordingly, the amount of $NH_3$ is actively adjusted so that the R reaches $R_{sp}$, or is maintained at the selected $R_{sp}$, to achieve or maintain a selected $\eta_{NOx\_SP}$.

At operation 312, an $NH_3$ slip detection process is performed. When an amount of slipped $NH_3$ is below $C_{NH3\_TH}$, or if no $NH_3$ slip is detected, $u_{NH3SLIP}$ is set to zero "0" or can even be set at a negative value at operation 314 indicating that a correction of $u_{SMC}$ is unnecessary. At operation 316, the control signal u is generated. In at least one embodiment, u is based on a summation ($u_{SMC}$+ $u_{NH3SLIP}$). Thus, when $u_{NH3SLIP}$ is set to zero "0", for example, u is generated as an un-modified control signal based on $u_{SMC}$. After generating u, the method returns to operation 300 and the operations described above are repeated.

When, however, $NH_3$ slip is detected at operation 312, $u_{NH3SLIP}$ is set to a value proportional to the concentration of $NH_3$ that has slipped from the SCR device 30 at operation 318. Accordingly, $u_{NH3SLIP}$ is added to $u_{SMC}$ at operation 316 such that u is generated to compensate for the slipped $NH_3$. The method returns to operation 300 and the operations described above are repeated.

Various non-limiting embodiments described herein provide a sliding mode SCR control system 200 that optimizes the operating performance of the SCR device 30. The system 200 includes a reductant module 100 that computes a novel set point referred to as an $NH_3$ coverage ratio set point ($R_{sp}$). The $R_{sp}$ value is computed as a function of a target NOx reduction efficiency ($\eta_{NOx}$) corresponding to the SCR device 30. Thus, a target $\eta_{NOx}$ for a given vehicle operating condition can be set using a $\eta_{NOx}$ set point ($\eta_{NOx\_sp}$), and the $\hat{R}$ can be actively monitored to determine whether the actual R associated with the SCR device has deviated from $R_{sp}$. The reductant module 100 controls a dosing system 16 to inject the correct amount of $NH_3$ into the exhaust gas stream to maintain R at $R_{sp}$, or near $R_{sp}$, thereby operating the SCR device 30 at $\eta_{NOx\_sp}$ while taking into account changing operating conditions of the vehicle.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An automotive vehicle including an exhaust system, the vehicle comprising:
   an internal combustion engine configured to combust an air/fuel mixture to generate an exhaust gas stream containing oxides of nitrogen (NOx);
   a dosing system that injects $NH_3$ into the exhaust gas stream to generate a mixture of $NH_3$ and exhaust gas;
   a selective catalyst reduction (SCR) device configured to store an amount of the $NH_3$ and to convert the NOx into diatomic nitrogen ($N_2$) and water ($H_2O$) based on the stored amount of the $NH_3$;
   an SCR status estimator device configured to determine an $NH_3$ coverage ratio (R) of the SCR device, the R indicative of the stored amount of $NH_3$ with respect to a maximum $NH_3$ storage capacity of the SCR device;
   an electronic hardware controller in signal communication with the dosing system and the SCR status estimator device, the controller configured to determine a target NOx reduction efficiency ($\eta_{NOx}$) of the SCR device, and to determine an $NH_3$ coverage ratio set point ($R_{sp}$) based on the $\eta_{NOx}$,
   wherein the controller generates an $NH_3$ control signal (u) that controls the dosing system based on a comparison between the R and the $R_{sp}$, and
   wherein the dosing system injects an amount of the $NH_3$ in response to the $NH_3$ control signal (u).

2. The automotive vehicle of claim 1, wherein the controller is configured to determine a deviation between the R and the $R_{sp}$, and to adjust the amount of $NH_3$ injected into the exhaust gas stream in response to the deviation.

3. The automotive vehicle of claim 2, further comprising:
   a NOx sensor configured to output a NOx signal indicating a mass concentration of the NOx,
   wherein the SCR status estimator device is an Extended Kalman Filter (EKF) including an input that receives the SCR outlet NOx sensor signal and an output in signal communication with the controller, and estimates a concentration of slipped $NH_3$ ($\hat{C}_{NH3}$) released by the SCR device, and a concentration of NOx exiting the SCR device.

4. The automotive vehicle of claim 3, wherein the EKF is configured to estimate the R and the $\hat{C}_{NH3}$ based on a physical linear dynamical model of the SCR device.

5. The automotive vehicle of claim 3, wherein the controller determines a temperature of the SCR device, updates $\eta_{NOx\_sp}$ in response to the temperature exceeding a temperature threshold, and computes an updated $R_{sp}$ based on the updated $\eta_{NOx\_sp}$.

6. The automotive vehicle of claim 4, wherein the controller determines the amount of $NH_3$ to be injected into the exhaust gas stream based further on the $\hat{C}_{NH3}$.

7. The automotive vehicle of claim 6, wherein the controller adjusts the amount of $NH_3$ injected into the exhaust gas stream to reduce the $\hat{C}_{NH3}$.

8. The automotive vehicle of claim 2, wherein the controller adjusts the amount of $NH_3$ injected into the exhaust gas stream in response to the deviation such that the $\eta_{NOx}$ is maintained within a $\eta_{NOx}$ threshold range.

9. A sliding mode selective catalyst reduction (SCR) control system included with an exhaust treatment system of an automotive vehicle, the sliding mode SCR control system comprising:
an $NH_3$ coverage ratio controller configured to determine an $NH_3$ coverage ratio set point ($R_{sp}$) that operates an SCR device at a selected NOx reduction efficiency set point ($\eta_{NOx\_SP}$);
an SCR status estimator device configured to estimate an $NH_3$ coverage ratio (R) of the SCR device, a concentration of slipped $NH_3$ ($\hat{C}_{NH3}$) released by the SCR device, and a concentration of NOx exiting the SCR device, the R indicative of an amount of $NH_3$ stored by the SCR device with respect to a maximum $NH_3$ storage capacity of the SCR device;
a $NH_3$ sliding-mode-control (SMC) module configured to monitor the R and to determine a deviation between R with respect to the $R_{sp}$;
a $NH_3$ calculator module configured to generate an $NH_3$ control signal (u) indicating the amount of $NH_3$ to be injected based on the deviation; and
a dosing system configured to inject the corrected amount of $NH_3$ based on the $NH_3$ control signal (u).

10. The sliding mode SCR control system of claim 9, wherein the amount of $NH_3$ injected according to the u reduces the deviation between R and $R_{sp}$ such that the $\eta_{NOx\_SP}$ is maintained.

11. The sliding mode SCR control system of claim 10, further comprising an $NH_3$ slip detection controller in signal communication with the SCR status estimator device, the $NH_3$ slip detection controller configured to determine an $NH_3$ slip event in response to the $\hat{C}_{NH3}$ exceeding an $NH_3$ slip threshold value ($C_{NH3\_TH}$).

12. The sliding mode SCR control system of claim 11, wherein the $NH_3$ slip detection controller is configured to generate a $NH_3$ slip correction value ($u_{NH3SLIP}$) that modifies the u in response to determining the $NH_3$ slip event.

13. A method of controlling a NOx reduction efficiency of a vehicle exhaust treatment system, the method comprising:
combusting an air/fuel mixture, via an internal combustion engine, to generate exhaust gas stream containing oxides of nitrogen (NOx);
injecting $NH_3$ into the exhaust gas stream, via a dosing system, to generate a mixture of $NH_3$ and exhaust gas;
storing the injected $NH_3$, via a selective catalyst reduction (SCR) device included in the exhaust treatment system, and converting the NOx into diatomic nitrogen ($N_2$) and water ($H_2O$) based on the stored amount of the $NH_3$;
determining a NOx reduction efficiency set point ($\eta_{NOx\_SP}$) indicative of a selected NOx reduction efficiency of the SCR device, and determining an $NH_3$ coverage ratio set point ($R_{sp}$) indicative of a stored amount of $NH_3$ with respect to a maximum $NH_3$ storage capacity of the SCR device for reaching the $\eta_{NOx\_SP}$;
estimating an $NH_3$ coverage ratio (R) indicative of an actual amount of the stored $NH_3$ with respect to the maximum $NH_3$ storage capacity of the SCR device; and
generating an $NH_3$ control signal (u) based on a comparison between the R and the $R_{sp}$, the u controlling the amount of $NH_3$ injected by the dosing system.

14. The method of claim 13, further comprising:
determining a deviation between the R and the $R_{sp}$; and
adjusting the amount of $NH_3$ injected into the exhaust gas stream in response to the deviation.

15. The method of claim 14, further comprising estimating R based on each of a mass concentration of the NOx exiting the SCR device, and an estimated concentration of slipped $NH_3$ ($\hat{C}_{NH3}$) released by the SCR device.

16. The method of claim 15, further comprising estimating the R and the $\hat{C}_{NH3}$, via an Extended Kalman Filter (EKF), based on a physical linear dynamical model of the SCR device.

17. The method of claim 15, further comprising:
monitoring a temperature of the SCR device;
updating $\eta_{NOx\_sp}$ in response to the temperature exceeding a temperature threshold; and
computing an updated $R_{sp}$ based on the updated $\eta_{NOx\_sp}$.

18. The method of claim 16, further comprising determining the amount of $NH_3$ to be injected into the exhaust gas stream based further on the $\hat{C}_{NH3}$.

19. The method of claim 18, further comprising adjusting the amount of $NH_3$ injected into the exhaust gas stream to reduce the $\hat{C}_{NH3}$.

20. The method of claim 14, further comprising adjusting the amount of $NH_3$ injected into the exhaust gas stream in response to the deviation such that the $\eta_{NOx}$ is maintained within a $\eta_{NOx}$ threshold range.

* * * * *